June 12, 1951   I. SAKS   2,556,823

CLUTCH PLATE

Filed Aug. 14, 1947

INVENTOR.
IRA SAKS
BY
Oberlin + Limbach
ATTORNEYS.

Patented June 12, 1951

2,556,823

UNITED STATES PATENT OFFICE 2,556,823

CLUTCH PLATE

Ira Saks, Shaker Heights, Ohio

Application August 14, 1947, Serial No. 768,676

2 Claims. (Cl. 64—27)

The present invention relates generally to clutch plates such as are adapted for automotive use and more particularly to certain improvements in what are commonly referred to as "cushion center" clutch plates which essentially comprise relatively rotatable hub and disk members provided with resilient means therebetween for yieldably resisting relative rotation of said members and thus reducing the amount of vibration and shock transmitted from one of said members to the other. As an additional feature, such cushion center clutch plates usually include cushion members on which are supported the friction facing rings, such cushion members being so formed that during the engagement of the facing rings with the fly wheel and pressure plate of an automotive clutch mechanism, for example, said facing rings will yield and move axially toward one another to thereby effect smooth shockless and chatterless engagement of the clutch plate.

One of the principal objects of this invention is to provide a clutch plate of the type referred to which is of such form that the manufacture and assembly of the various parts thereof is greatly facilitated.

Another object of this invention is to provide in a clutch a novel means which imparts flexibility to the disk member for supplementing the cushioning action obtained through the cushion center and the cushioning members interposed between the friction facing rings.

Another object of this invention is to provide a clutch plate having novel means therein for automatically compensating for wear of the parts thereby avoiding objectionable rattles and noises which would otherwise occur in the absence of such wear compensating means.

Other objects and advantages of the invention will become apparent as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
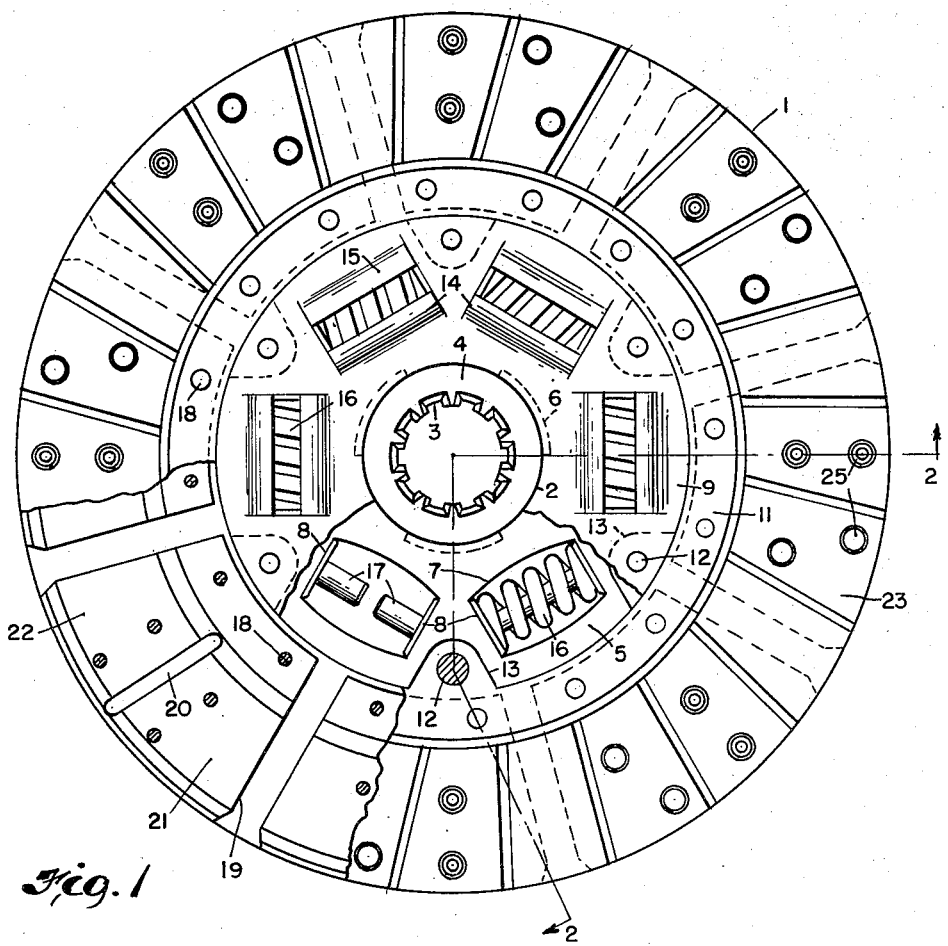
Fig. 1 is a face view of a preferred form of clutch plate with portions thereof cut away to more clearly illustrate the underlying structure.

As illustrated in the drawing, the clutch plate constituting the present invention comprises a disk member 1 adapted to be engaged in driving relation between the fly wheel and pressure plate of a clutch assembly, not shown, and a hub member 2 having a splined opening 3 therethrough for axial sliding connection with a shaft, not shown, adapted to be driven through the clutch assembly.

Said hub member 2 comprises a central tubular portion 4 having a flange 5 projecting radially therefrom, said flange preferably being in the form of a separate ring formed with an inner bore non-rotatably fitting over the lugs 6 on the tubular portion 4. Said flange 5 is preferably axially fixed on said portion 4 as by a driving fit, staking, welding or like operations. Said flange 5 is formed with a plurality of openings 7 therethrough of generally barrel-shaped cross section, as shown, with the longitudinal axes thereof forming a regular polygon coaxial with the central axis of the hub member. The end walls 8 of each of such openings 7 are disposed perpendicular to the longitudinal axis thereof.

The disk member 1 comprises a pair of identical cover plates 9 and 10 straddling the flange 5 and an intermediate plate 11 interposed between one of said cover plates and the flange 5, said plates 9, 10 and 11 being rotatably fitted over the tubular portion 4 of the hub member and connected to one another as by means of rivets 12 which pass through the V-shaped notches 13 formed in the periphery of flange 5. There is sufficient clearance between the rivets 12 and the respective V notches 13 to permit a desired degree of relative rotation of said hub and disk members. The plates 9, 10 and 11 are also formed with openings 7 therethrough which are in register with the openings in the flange 5. In the cover plates 9 and 10 such openings are formed by striking out the portions 14 and 15 to form lips for retaining coil springs 16 and spring seats 17 within such openings. Said seats 17 each comprise a reduced cylindrical portion fitting within the coil spring 16 and an enlarged flange portion providing a surface engaged by one end of spring 16 and another surface in engagement with the end walls 8 of the registering openings through the flange 5 and the plates 9, 10 and 11. The reduced portions of each pair of seats 17 are of length such that the opposed ends thereof engage one another before the coil spring 16 therebetween is compressed to its solid height. Thus there are actually two different forms of limiting stops to prevent over-stressing of the springs, viz., the engagement of the V notches 13 with the rivets 12 and the engagement of the reduced ends of the seats 17 with one another. In the clutch plate illustrated, the former expedient is utilized as the limiting stop means.

Figure 2:
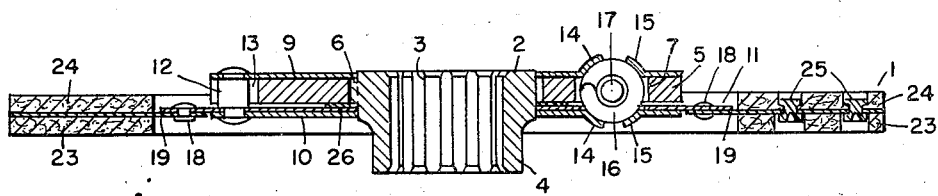
Fig. 2 is a cross section view of the plate illustrated in Fig. 1 taken substantially along the line 2—2, Fig. 1.

By reference to Fig. 2, it can be seen that the lips 14 and 15 on the cover plates 9 and 10 are operative to prevent displacement of the springs 16 and seats 17 axially of the clutch plate and that the reduced cylindrical ends of the seats 17 are operative to prevent buckling of the springs 16 when compressed. As best shown in Fig. 1, the outward bulging shape of the outer wall of each opening 7 in the flange 5 provides an unrestricted opening whereby the springs 16 may assume a slightly curved or bowed form by centrifugal force during rotation of the clutch plate without any restraint in the yielding action thereof as by engagement thereof with the outer wall of the openings.

Briefly outlined, the operation of the cushion center structure described above is as follows. It is apparent that torque loads imparted to either the disk member 1 or the hub member 2 in excess of a predetermined maximum as determined by the initial compression of the springs 16 within the openings 7 will effect relative rotation of said members with further compression of said springs to thus avoid positive and sudden transmission of forces from one member to the other.

For ordinary automotive use, the cover plates 9 and 10 are preferably fabricated from deep draw steel stock of thickness of the order of .060 inch, whereas the intermediate plate 11 is preferably fabricated from high carbon steel stock of thickness of the order of .035 inch. It has been found that the intermediate plate 11 may be considerably thinner than the cover plates 9 and 10 insofar as the torque transmitting strength of the outer portion thereof is concerned.

Figure 3:
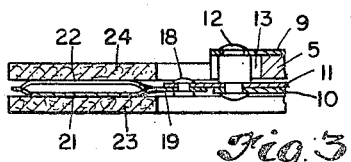
Fig. 3 is a fragmentary cross section view similar to the left-hand portion of Fig. 2 except illustrating the facing rings in the positions they assume when the clutch with which such plate is associated is disengaged.

Secured to the outer portion of the intermediate plate 11 as by rivets 18 are a plurality of equally spaced cushion members 19 forming a substantially continuous annular ring about the intermediate plate 11. Said cushion members are of segmental form and are preferably made from spring steel of thickness substantially equal to that of the intermediate plate 11. The cushion members 19 herein illustrated are of a form similar to those disclosed in Daniel Kelleher application Ser. No. 609,369 filed August 7, 1945, now Patent No. 2,502,653, issued April 4, 1950, and include a generally radially disposed slot 20 therethrough with oppositely displaced flat areas 21 and 22 on either side of such slot 20 to which the friction facing rings 23 and 24 are respectively adapted to be secured as by the rivets 25. When the clutch is disengaged, the facings 23 and 24 are in the position illustrated in Fig. 3 and when the clutch is engaged, the facings 23 and 24 will be yieldably moved toward one another to the position illustrated in Fig. 2, such yielding movement of the facings effecting smooth engagement of the clutch and consequent avoidance of chatter.

As a further feature of this invention, the disk member 1 is so made that it loosely straddles the flange 5 of the hub member 2, there being interposed between said members a spring washer 26 of dish-shaped form compressed to substantially the flat form shown whereby to yieldably urge the cover plate 9 against one side of flange 5 and to hold the intermediate plate 11 spaced away from the other side of flange 5. Thus, the disk member 1 as a whole may yield axially and also about the inner portion of flange 5 as a fulcrum to further minimize chatter of the clutch plate and thereby supplement the action of the cushion members 19. Furthermore, said spring washer 26 is operative to automatically take up wear of the plates 9 and 11 for preventing the development of axial looseness of the assembly and the consequent objectionable rattling and noise which would otherwise be caused by such wear in the absence of a wear compensating means.

It will now be apparent that by reason of the uniform spacing of the openings 7 in the clutch plate with the springs 16 and seat members 17 therein, of the V notches 13 in flange 5, of the rivets 12 which hold the plates 9, 10 and 11 in spaced relation straddling the flange 5, of the lugs 6 on the hub 2 and of the cushion members 19 about the periphery of the intermediate plate 11 all contribute toward the provision of a balanced clutch plate with the center of gravity substantially coinciding with the axis of rotation thereof. Furthermore, inasmuch as the cover plates 9 and 10 and all of the aforesaid parts are identical to one another, the manufacture and assembly of such parts is greatly simplified and facilitated. It is to be noted further that each cushion member 19 is symmetrical in the sense that it is immaterial which of its two sides engages the intermediate plate 11.

A further feature of this invention is that the doubling up of the cover plate 10 and the intermediate plate 11 at the openings 7 provides for an increased bearing area for the spring seats 17 whereby the end walls 8 of the openings will not be so readily damaged or enlarged.

Other modes of applying the principle of the invention may be employed, change being made as regards the details decribed, provided the features stated in any of the following claims or the equivalent of such be employed.

I therefore particularly point out and distinctly claim as my invention:

1. In a cushion-center clutch plate, the combination of a hub member provided with a radially projecting flange, a disc member rotatably fitted on said hub member comprising a pair of similar annular cover plates disposed on opposite sides of such flange, an intermediate plate, thinner than said cover plates, disposed between one of said cover plates and such flange and extending radially outwardly of said cover plates and flange, and fastening members fixedly connecting all of said plates together with said last-named plate against said one cover plate, all of said plates and said flange being formed with registering openings providing opposed torque transmitting faces respectively, and springs in such openings bearing against all of said faces yieldably opposing relative rotation of said hub and disc members and consequent relative movement of such opposed torque transmitting faces toward each other, said cover plates each being formed with spring retainer portions holding said springs against displacement laterally from such openings.

2. In a cushion-center clutch plate, the combination of a hub member provided with a radially projecting flange, a disc member rotatably fitted on said hub member comprising a pair of similar annular cover plates disposed on opposite sides of such flange, a third plate, thinner than said cover plates, disposed adjacent one of said cover plates and extending radially outwardly of said cover plates and flange, and fastening members fixedly connecting all of said plates together with said last-named plate against said one cover plate, all of said plates and said flange being formed with registering openings providing opposed torque-transmitting faces respectively, and springs in such openings bearing against all of said faces yieldably opposing relative rotation of said hub and disc members and consequent relative movement of such opposed torque transmitting faces toward each other, said cover plates each being formed with spring retainer portions holding such springs against displacement laterally from such openings.

IRA SAKS.

REFERENCES CITED

The following references are of record in the file of this patent:

UNITED STATES PATENTS

| Number | Name | Date |
|---|---|---|
| 2,124,013 | Spase | July 19, 1938 |
| 2,221,463 | Wolfram | Nov. 12, 1940 |
| 2,276,416 | Nutt | Mar. 17, 1942 |
| 2,286,502 | Newton | June 16, 1942 |
| 2,314,948 | Nutt | Mar. 30, 1943 |

FOREIGN PATENTS

| Number | Country | Date |
|---|---|---|
| 552,951 | Great Britain | Apr. 30, 1943 |